Dec. 15, 1964  J. F. GRUNDMANN  3,161,206
VALVE CONSTRUCTION
Filed Nov. 2, 1961

JOHN F. GRUNDMANN
INVENTOR.

KENDRICK, SCHRAMM & STOLZY
BY
*A. Donald Stolzy*
ATTORNEYS.

United States Patent Office 3,161,206
Patented Dec. 15, 1964

3,161,206
VALVE CONSTRUCTION
John F. Grundmann, 651 S. Irena Ave.,
Redondo Beach, Calif.
Filed Nov. 2, 1961, Ser. No. 149,567
4 Claims. (Cl. 137—433)

This invention relates to the fluid mechanics art, and more particularly to apparatus for controlling the flow of fluid.

Although the present invention will have application in a great many fields and is not therefore to be limited to any particular one including that described in this paragraph, it has been found especially useful in the control of the circulation of hot water in coin-operated vending machines for dispensing brewed coffee, brewed coffee being distinguished from coffee made by mixing a pulverized dehydrated coffee bean extract or "instant" coffee with hot water.

New and improved component parts may be employed to advantage in accordance with the present invention. One of these is a fluid flow control device including a float operated check valve, or a gravity operated check valve.

According to a feature of the present invention, the fluid flow control device or check valve may include a cylindrical pipe having a lower internal cavity of a predetermined diameter, a middle internal cavity of a second predetermined diameter greater than said first predetermined diameter, and an annular shoulder at the upper end of the lower internal cavity, a cylindrical float extending downwardly in the lower internal cavity into the middle internal cavity. The average density of the float is less than that of fluid in the pipe section. A disc-shaped flange having a diameter less than the second predetermined diameter and greater than the first predetermined diameter is then fixed to the upper end of the float in the middle internal cavity in a plane approximately perpendicular to the axis of the float to seat on the shoulder when pressure above the float exceeds the pressure below the float by a predetermined value. Stop means to limit movement of the disc-shaped flange on the float upwardly in the middle internal cavity beyond a predetermined distance from the shoulder is also provided. The stop means may comprise a spider fixed to the pipe section internally thereof above the disc-shaped flange. A pin is then fixed to the disc-shaped float at the center thereof in a position extending downwardly in the pipe section to limit the upward vertical movement of the float therein.

According to still another feature of the present invention, a fluid flow control device or check valve may include that described in the paragraph immediately preceding this paragraph with the exception that an annular flange may be provided that extends radially inward at the upper end of the middle internal cavity, and an upper internal cavity is provided above the annular flange having a third predetermined diameter less than the annular flange inside diameter, the annular flange inside diameter also being less than the second predetermined diameter. A spider assembly is then provided in the upper internal cavity, the spider assembly including a spider slidable vertically in the upper internal cavity and having an outside diameter greater than the annular flange inside diameter to rest thereon, the spider assembly also including a projection fixed centrally with the spider extending downwardly into the middle internal cavity to hold the disc-shaped flange on the float in spaced relation to the annular flange when the spider rests thereon, the spider assembly having an average density greater than that of the fluid.

The above-described and other advantages of the present invention will be better understood from the following description considered in connection with the accompanying drawings.

In the drawings, which are to be regarded as merely illustrative:

Figure 1:
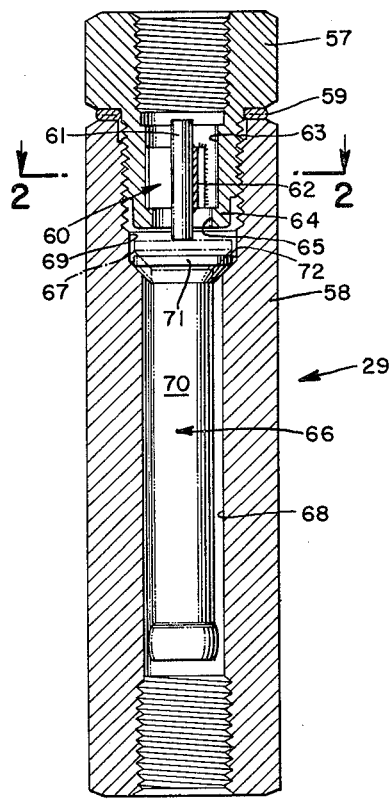
FIG. 1 is an enlarged longitudinal sectional view of a valve.
Figure 3:
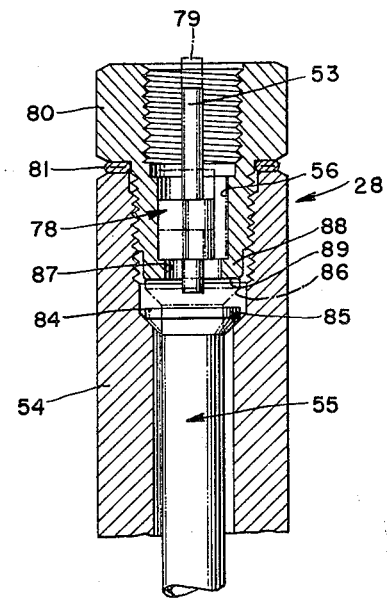
FIG. 3 is a broken away longitudinal sectional view of another valve.
Figure 4:
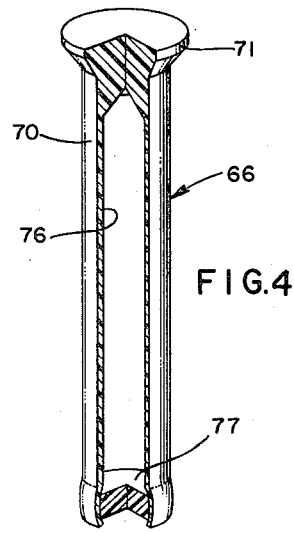

FIG. 4. is a perspective view partly in section of a float employed in both of the valves illustrated in FIGS. 1 and 3.

Details of two valves 28 and 29 are illustrated in FIGS. 1, 2, 3 and 4. Valve 29 is illustrated in FIG. 1 including a fitting 57 threaded into a housing 58, and an O-ring 59 provided therebetween. A spider assembly 60 is located in the lower end of fitting 57 to support a stop pin 61 therein, stop pin 61 being welded to a spider 62 which in turn is welded to an internal bore 63 in fitting 57. Fitting 57 is provided with a flange at 64 having a bore 65 therein to permit the flow of fluid in either direction through fitting 57. Pin 61 prevents a float indicated at 66 from rising further in housing 58 than the dotted line position shown at 67. This means that fluid can flow in either direction around float 66 provided pressure above float 66 is not sufficient to cause the valve 29 to close. Water never generally flows downwardly in valve 29. The flow of water in valve 29 when float 66 is in the position indicated at 67 is upwardly between float 66 and lower and middle internal cavities 68 and 69 of the valve, and upwardly into an upper internal cavity thereof defined by bore 63 over the top of float 66 through the bore 65 of flange 64.

Float 66 is provided with a cylindrical body portion 70 having radially projecting flange 71 fixed to or made integral with its upper end providing a valve to seat on a valve seat or shoulder 72 of housing 58 when the pressure above valve 29 exceeds the pressure therebelow as viewed in FIG. 1.

Valve 29 is a float operated valve. For this reason, for the valve to remain open, the average density of the float 66 must be less than that of the medium in which it is used. This is the reason the valve 66 normally occupies the position indicated in dotted lines at 67.

Figure 2:
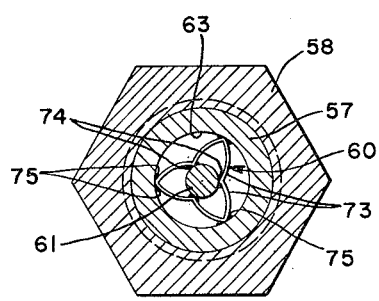
FIG. 2 is a transverse sectional view taken on the line 2—2 of the valve shown in FIG. 2.

As shown in FIG. 2, spider 60 is made up of curved pieces of copper sheet material indicated at 73 welded both at points 74 and 75 to pin 61 and bore 63 of fitting 77, respectively. Float 66 is also indicated in FIG. 4 and as can be seen may be made of a piece of plastic material on a lathe or molded with flange 71 integral with cylindrical portions 70. The bore 76 of cylindrical portion 70 may be drilled. A plastic disc 77 may be press fit into the lower end of float 66 as shown in FIG. 4 and cemented in that position.

An upper portion of valve 28 is shown in FIG. 3, the lower portion thereof being identical to the lower portion of valve 29 shown in FIG. 1. As a matter of fact, all of the structure shown in FIG. 3 may be identical to that illustrated in FIG. 1 with the exception that welds at the point 75 are not provided, whereby the spider 78 therein may move vertically from the position shown therein to the position indicated in dotted lines at 79. Spider 78 which is fixed to pin 53 simply provides a weight which is movable.

As stated previously, the construction of valve 28 otherwise may be identical to that of valve 29. In particular, fittings 80 and 57 may be identical as well as O-rings 81 and 59. The same is true for spiders 78 and 60 as well as housings 54 and 58 and floats 55 and 66.

Float 55 is shown in solid lines in FIG. 3 in a closed position having a flange 84 fixed to or integral with its upper end in engagement with a shoulder or valve seat 85 inside body 54. Valve 28 closes when float 55 is in the position shown in solid lines. Float 55 can move to the dotted line position indicated at 86 in FIG. 4 and thereby close a bore 87 of a flange 88 fixed to the lower end of fitting 80 by engagement of flange 84 therewith.

Float 55 may also be maintained in a position not shown in FIG. 3. This position is assumed by the upper end of flange 84 abutting the lower end of pin 53 in the position shown in solid lines in FIG. 3. In this regard, it is to be noted that spider 78 and pin 53 are prevented from falling inside housing 54 or inside bore 56 of fitting 80 farther than flange 88 because the outer edges of spider 78 rest on flange 88. The buoyancy of float 55 is less than the weight of spider 78 in pin 53. That is, the upper end of flange 84 abuts the lower end of pin 53 in the position shown in solid lines in FIG. 3. It will be appreciated that valve 28 is not only a float operated valve, but also a gravity operated valve.

In addition to the foregoing features, another is also provided in that valve 28 closes when the differential pressure thereacross exceeds a predetermined amount regardless of on which side of the valve the pressure is highest.

Another outstanding feature of the invention is the use of the particular valves 28 and 29 of the constructions illustrated in FIGS. 1, 2, 3 and 4. These valves are extremely sensitive and accurate. Nevertheless, neither of the valves 28 or 29 are operated electrically.

Although only one specific embodiment of the system of the invention has been described and illustrated, it is to be expressly understood that the invention is by no means limited to the embodiment selected to be so described and illustrated. Many changes and modifications of the invention will of course suggest themselves to those skilled in the art. Thus, the invention is defined only in the appended claims.

What is claimed is:

1. A fluid flow control device comprising: a vertically disposed cylindrical pipe; a fluid in said pipe; an annular shoulder inside of said pipe; a cylindrical float having a diameter sufficiently small at one of its ends to project through said annular shoulder inside said pipe on one side of said shoulder, said pipe on one side of said shoulder having a diameter to guide vertical movement of said one end of said float therein, said float having a radially projecting flange at the other of its ends to seat on said shoulder when the pressure in said pipe above said shoulder is greater than the pressure therebelow, said float having an average density less than that of said fluid; and stop means to resist upward vertical movement of said flange to a predetermined distance from said shoulder, said stop means including a spider assembly movable vertically.

2. A fluid flow control device comprising: a cylindrical pipe having a lower internal cavity of a first predetermined diameter, a middle internal cavity of a second predetermined diameter greater than said first predetermined diameter, an annular shoulder at the upper end of said lower internal cavity, an annular flange extending radially inward at the upper end of said middle internal cavity, and an upper internal cavity above said annular flange having a third predetermined diameter less than said annular flange inside diameter, said annular flange inside diameter also being less than said second predetermined diameter; a cylindrical float extending downwardly in said lower internal cavity in spaced relation thereto, the upper end of said float extending into said middle internal cavity; a fluid in said pipe, said float having an average density less than that of said fluid; a disc-shaped flange fixed to the upper end of said float in said middle internal cavity in a plane approximately perpendicular to the axis of said float, said disc-shaped flange having a diameter less than said second predetermined diameter and greater than said annular flange inside diameter; and a spider assembly in said upper internal cavity, said spider assembly including a spider slidable vertically in said upper internal cavity and having an outside diameter greater than said annular flange inside diameter to rest thereon, said spider assembly also including a projection fixed centrally with said spider extending downwardly into said middle internal cavity to hold said disc-shaped float flange in spaced relation to said annular flange when said spider rests thereon, said spider assembly having an average density greater than that of said fluid.

3. A valve construction comprising: a cylindrical pipe having a lower internal cavity of a predetermined diameter, a middle internal cavity of a second predetermined diameter greater than said first predetermined diameter, and an annular shoulder at the upper end of said lower internal cavity; a cylindrical float extending downwardly in said lower internal cavity in spaced relation thereto, the upper end of said float extending into said middle internal cavity; a fluid in said pipe section, the average density in said float being less than that of said fluid; a disc-shaped flange having a diameter less than said second predetermined diameter and greater than said first predetermined diameter fixed to the upper end of said float in said middle internal cavity in a plane approximately perpendicular to the axis of said float to seat on said shoulder when the pressure above said float exceeds the pressure below said float; and stop means to limit movement of said disc-shaped flange on said float upwardly in said middle internal cavity beyond a predetermined distance from said shoulder.

4. A valve construction comprising: a cylindrical pipe having a lower internal cavity of a predetermined diameter, a middle internal cavity of a second predetermined diameter greater than said first predetermined diameter, and an annular shoulder at the upper end of said lower internal cavity; a cylindrical float extending downwardly in said lower internal cavity in spaced relation thereto, the upper end of said float extending into said middle internal cavity; a fluid in said pipe section, the average density in said float being less than that of said fluid; a disc-shaped flange having a diameter less than said second predetermined diameter and greater than said first predetermined diameter fixed to the upper end of said float in said middle internal cavity in a plane approximately perpendicular to the axis of said float to seat on said shoulder when the pressure above said float exceeds the pressure below said float; stop means to limit movement of said disc-shaped flange on said float upwardly in said middle internal cavity beyond a predetermined distance from said shoulder; a spider fixed to said pipe internally thereof above said disc-shaped flange; and a pin fixed to said spider at the center thereof in a position extending downwardly in said pipe section to limit movement of said disc-shaped flange on said float upwardly in said middle internal cavity beyond a predetermined distance from said shoulder by contact of the lower end of said pin with the center of said disc-shaped flange.

References Cited in the file of this patent

UNITED STATES PATENTS

| | | |
|---|---|---|
| 1,162,408 | Shaffer | Nov. 30, 1915 |
| 1,549,007 | Khun | Aug. 11, 1925 |
| 1,897,492 | Ledoux | Feb. 14, 1933 |
| 2,759,638 | Howard | Aug. 21, 1956 |
| 2,784,733 | Martinez | Mar. 12, 1957 |
| 2,871,875 | Dale | Feb. 3, 1959 |
| 2,982,447 | Austin | May 2, 1961 |